United States Patent
Ide et al.

(10) Patent No.: US 6,242,885 B1
(45) Date of Patent: Jun. 5, 2001

(54) METHOD FOR ESTIMATING INDUCED ELECTROMOTIVE FORCE AND SPEED OF INDUCTION MOTOR, METHOD FOR CORRECTING MISALIGNMENT OF SHAFT THEREOF, AND INDUCTION MOTOR CONTROLLER

(75) Inventors: Kozo Ide; Shinya Morimoto; Ryuichi Oguro, all of Fukuoka (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/446,892

(22) PCT Filed: Jul. 1, 1998

(86) PCT No.: PCT/JP98/02956

§ 371 Date: Dec. 30, 1999

§ 102(e) Date: Dec. 30, 1999

(87) PCT Pub. No.: WO99/01929

PCT Pub. Date: Jan. 14, 1999

(30) Foreign Application Priority Data

Jul. 2, 1997 (JP) .................................................. 9-177191

(51) Int. Cl.$^7$ .................................................. H02P 21/00
(52) U.S. Cl. .......................... 318/811; 318/805; 318/809
(58) Field of Search ..................................... 318/799, 800, 318/801, 805, 807, 808, 809, 810, 811, 812

(56) References Cited

U.S. PATENT DOCUMENTS

| 4,885,520 | * | 12/1989 | Sugimoto et al. | 318/808 |
| 5,721,479 | * | 2/1998 | Kumar et al. | 318/801 |
| 5,821,727 | * | 10/1998 | Yura | 318/809 |
| 5,828,199 | * | 10/1998 | Tajima et al. | 318/779 |

FOREIGN PATENT DOCUMENTS

| 2-70282 | * | 3/1990 | (JP) | H02P/5/408 |
| 6-319290 | * | 3/1990 | (JP) | H02P/7/63 |
| 3-178589 | * | 8/1991 | (JP) | H02P/5/408 |
| 7-87800 | * | 3/1995 | (JP) | H02P/21/00 |
| 9-191698 | * | 7/1997 | (JP) | H02P/21/00 |
| 10-174499 | * | 6/1998 | (JP) | H02P/21/00 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

A three-phase-to-two-phase converter detects two-phase currents of three-phase stator currents, converts the stator currents into a γ-δ coordinate system to derive a γ-axis current and a δ-axis current. The γ-axis current, the δ-axis current, and voltage command values outputted respectively from a γ-axis current controller and a δ-axis current controller are entered to a stator current and induced electromotive force estimator, which determines estimated values of the stator currents and estimated values of an induced electromotive force in the γ-δ coordinate system.

6 Claims, 1 Drawing Sheet

METHOD FOR ESTIMATING INDUCED ELECTROMOTIVE FORCE AND SPEED OF INDUCTION MOTOR, METHOD FOR CORRECTING MISALIGNMENT OF SHAFT THEREOF, AND INDUCTION MOTOR CONTROLLER

BACKGROUND OF THE INVENTION

1. Field of the Invention

The present invention relates to a method of controlling an induction motor by bringing γ-δ coordinate axes which are reference coordinate axes of a control system configuration into agreement with d-q coordinate axes where the d-axis represents the direction of the vector of secondary magnetic fluxes of the induction motor and the q-axis represents an axis perpendicular to the d-axis.

2. Discussion of the Background

Processes for estimating the speed of an induction motor using the induced electromotive force (induced voltage) are employed in industrial applications for the purpose of making the V/f control highly accurate and simplifying calculations for the speed-sensor-less vector control because the processes are physically obvious from the fact that an induced electromotive force is generated when the rotor rotates and also because the processes are able to calculate the rotational angular velocity of secondary magnetic fluxes with a relatively small amount of calculations.

Examples of conventional processes include [1] "Study of making speed-sensor-less vector control highly responsive", 1994 Electric Society National Conference No. 655, and [2] "Speed-sensor-less vector control in view of weak field region", 1994 Electric Society National Conference No. 656. The former process pays attention to a voltage model of the q-axis of a d-q coordinate system and proposes a simple disturbance estimator for estimating a q-axis induced electromotive force using a q-axis voltage command value as an input and a q-axis current as an output. The simple disturbance estimator estimates a speed by multiplying the estimated q-axis induced electromotive force by coefficients representing a motor constant and a flux command value. The former process is an improvement over a process that uses the output of a q-axis current controller as an estimated speed. The former process achieves separation between a speed control system and a current control system by introducing the estimation of an induced electromotive force, and is successful in improving the speed control response. The latter process estimates an induced electromotive force from a measured voltage and a measured current using a voltage equation of the induction motor, estimates a power supply angular frequency from the estimated induced electromotive force and an estimated value of secondary magnetic fluxes, and subtracts a command value for a slip frequency from the estimated power supply angular frequency to estimate a speed.

The above conventional processes basically use voltage and current equations in the d-q coordinate system of an induction motor, i.e., $$\begin{bmatrix} \epsilon d \\ \epsilon q \end{bmatrix} = \begin{bmatrix} -Rs & \sigma Ls\omega^* \\ -\sigma Ls\omega^* & -Rs \end{bmatrix} \begin{bmatrix} Isd \\ Isq \end{bmatrix} + \begin{bmatrix} usd \\ usq \end{bmatrix} - \sigma Ls \frac{d}{dt} \begin{bmatrix} Isd \\ Isq \end{bmatrix} \quad (1)$$

$$\begin{bmatrix} \epsilon d \\ \epsilon q \end{bmatrix} = \frac{Lm}{Lr} \frac{d}{dt} \begin{bmatrix} \Phi rd \\ \Phi rq \end{bmatrix} + \frac{Lm}{Lr} \begin{bmatrix} -\omega^* \Phi rq \\ \omega^* \Phi rd \end{bmatrix} \quad (2)$$

where εd: a d-axis component of the induced electromotive force, εq; a q-axis component of the induced electromotive force, Φrd: a d-axis component of the secondary magnetic fluxes, Φrq: a q-axis component of the secondary magnetic fluxes, Isd: a d-axis component of the stator current (excitation-related current), Isq: a q-axis component of the stator current (torque-related current), usd: a d-axis component of the stator voltage, usq: a q-axis component of the stator voltage, Rs: a stator resistance, Lm: mutual inductance, Lr: rotor self-inductance, Ls: stator self-inductance, δ=1−Lm²/(LsLr), ω*: a power supply angular frequency. The conventional processes estimate an induced electromotive force according to the equation (1), and estimate a speed according to the equation (2).

Since a current differential term in the right-hand side of the equation (1) is omitted, the conventional processes fail to estimate a correct induced electromotive force while the current is varying. If the current differential term is not omitted, then noise contained in a measured current value is amplified. The literature [1] proposes a process of equivalently canceling a low-pass filter used to output an estimated speed and a current differential term. The literature [1] assumes an ideal vector control state, estimates only a q-axis induced electromotive force, and estimates a speed using the estimated q-axis induced electromotive force. However, there is a possibility that the ideal vector control state may collapse due to a change in the induction motor constant and errors of measured current and voltage with respect to actual current and voltage. The literature [1] is silent about how to compensate for such a collapse of the ideal vector control state. The literature [2] proposes the following equation (3) in order to compensate for a collapse of the ideal vector control state:

$$\omega^* = sqn(\epsilon q)(|\epsilon q|\Phi rd - K\Phi rd^*\epsilon d) \quad (3)$$

In a steady state, the existence of εd signifies the existence of Φrq as can be seen from the equation (2), and indicates that the ideal vector control state has collapsed. Specifically, the γ-δ coordinate axes which are reference coordinate axes of the control system configuration and the d-q coordinate axes are displaced from each other. Axis-displacement compensation is carried out by eliminating εd in the second term of the right-hand side of the equation (3). However, the equation is contradictory in that ω* is necessary to estimate the induced electromotive force used in the equation (3) and ω* is necessary to determine ω*. In order to actually perform software-implemented calculations of the equation, ω* at a preceding time in a discrete system is used. If ω* varies quickly, then the speed response tends to be delayed.

SUMMARY OF THE INVENTION

It is an object of the present invention to provide a method of estimating an induced electromotive force of an induction motor, a method of estimating a speed thereof, a method of correcting an axis displacement thereof, and an apparatus for controlling an induction motor, for estimating an accurate induced electromotive force, eliminating the contradiction of the above speed estimating equation by estimating a speed directly using the estimated induced electromotive force and improving a speed response, and simultaneously compensating for an axis displacement error.

A method of estimating an induced electromotive force of an induction motor according to the present invention comprises the steps of detecting at least two of three-phase stator currents of the induction motor, converting the detected stator currents into a γ-δ coordinate system to derive a γ-axis current Isγ and a δ-axis current Isδ, constructing a state estimator using differences Isγ–Îsγ, Isδ–Îsδ between estimated values Îsγ, Îsδ of the γ-axis current and the δ-axis current in a preceding control loop and actual values thereof as corrective quantities, using stator voltage command values Usγ*, Usδ* in the γ-δ coordinate system as inputs, and using an induced electromotive force generated by rotation of a rotor as a disturbance, and estimating estimated values Îsγ, Îsδ of stator currents and estimated values $\hat{\epsilon}_\gamma$, $\hat{\epsilon}_\delta$ of the induced electromotive force in the γ-δ coordinate system.

A method of estimating a speed of an induction motor according to the present invention comprises the steps of adding the product of the difference Imrγ–Isγ between an estimated value or a command value Imrγ of a γ component of a secondary field current and a γ component Isγ of a stator current and a motor constant to a γ-axis induced electromotive force $\hat{\epsilon}_\gamma$ in the γ-δ coordinate system which has been estimated by the above method, thereby to calculate a new induced voltage Eγest, adding the product of the difference Imrδ–Isδ between an estimated value or a command value Imrδ of a δ component of the secondary field current and a δ component Isδ of the stator current and the motor constant to a δ-axis induced electromotive force $\hat{\epsilon}_\delta$ in the γ-δ coordinate system which has been estimated by the above method, thereby to calculate a new induced voltage Eδest, estimating the magnitude of a rotor speed $\omega_\gamma$ of the induction motor using the sum of the squares of the induced voltages Eγest, Eδest and an estimated value or a command value of secondary magnetic fluxes, determining the sign of the rotor speed with the sign of the induced voltage Eδest, and estimating an estimated value $\hat{\omega}_\gamma$ of the rotor speed.

A method of correcting an axis displacement of an induction motor according to the present invention comprises the step of subtracting the product of the induced voltage Eγest and a gain from the speed value estimated by the above method to adjust the estimated speed value in a direction to eliminate the induced voltage Eγest for thereby bringing γ-δ coordinate axes into agreement with d-q coordinate axes.

According to the present invention, there is provided an apparatus for controlling an induction motor by bringing γ-δ coordinate axes which are reference coordinate axes of a control system configuration into agreement with d-q coordinate axes where the d-axis represents the direction of the vector of secondary magnetic fluxes of the induction motor and the q-axis represents an axis perpendicular to the d-axis, comprising:

a speed controller for being supplied with the difference between a speed command value $\omega_\gamma^*$ and an estimated speed value $\hat{\omega}_\gamma$ as a first difference and outputting a δ-axis current value Isδ*;

a δ-axis current controller for being supplied with the difference between a δ-axis current command value Isδ* and a δ-axis current Isδ or a δ-axis current estimated value Îsδ and outputting a δ-axis voltage command value Usδ*;

a γ-axis current controller for being supplied with the difference between a command value Imr* of a secondary field current related to the magnitude of secondary magnetic fluxes and a γ-axis current Îsγ or a γ-axis current estimated value Îsγ as a second difference and outputting a γ-axis voltage command value Usγ*;

a polar coordinate converter for converting the voltage command values Usδ*, Usγ* into magnitudes and phases of the voltage command values;

a slip angular frequency calculator for being supplied with the first difference and the second difference and determining a slip angular frequency command value $\omega_{sl}^*$;

an integrator for converting a rotational speed of the γ-δ coordinate axes determined by adding the estimated speed value $\hat{\omega}_\gamma$ and the slip angular frequency command value $\omega_{sl}^*$ to each other into an angle;

an inverter circuit for being supplied with an output from the polar coordinate converter and the position of the rotated γ-δ coordinate axes outputted from the integrator, and generating a PWM signal to energize the induction motor;

a three-phase-to-two-phase converter for detecting three-phase currents from stator currents Isu, Isv and converting the detected three-phase currents into two-phase alternating currents; and a stator current and induced electromotive force estimator for being supplied with Isγ, Isδ subjected to coordinate transformation using the position of the γ-δ coordinate axes from the two-phase alternating currents and the voltage command values Usγ*, Usδ*, performing calculations thereon, and outputting estimated values Îsγ, Îsδ of the stator currents and estimated values $\hat{\epsilon}_\gamma$, $\hat{\epsilon}_\delta$ of an induced electromotive force in the γ-δ coordinate system.

The apparatus for controlling the induction motor according to the present invention also has a speed estimator for being supplied with the estimated values $\hat{\epsilon}_\gamma$, $\hat{\epsilon}_\delta$ of the induced electromotive force and carrying out the above method of estimating the speed.

The apparatus for controlling the induction motor according to the present invention also has an axis displacement corrector for carrying out the above method of correcting the axis displacement.

The method of estimating the induced electromotive force of the induction motor according to the present invention is constructed of a state estimator expressed by the following equation (4) based on the theoretical equation (1) of the induction motor:

$$\frac{d}{dt}\begin{bmatrix} \hat{I}s\gamma \\ \hat{I}s\delta \\ \hat{\epsilon}\gamma \\ \hat{\epsilon}\delta \end{bmatrix} = \begin{bmatrix} -Rs/\sigma Ls & \omega^* & -1/\sigma Ls & 0 \\ -\omega^* & -Rs/\sigma Ls & 0 & -1/\sigma Ls \\ 0 & 0 & 0 & 0 \\ 0 & 0 & 0 & 0 \end{bmatrix}\begin{bmatrix} \hat{I}s\gamma \\ \hat{I}s\delta \\ \hat{\epsilon}\gamma \\ \hat{\epsilon}\delta \end{bmatrix} + \quad (4)$$

$$\frac{1}{\sigma Ls}\begin{bmatrix} us\gamma^* \\ us\delta^* \end{bmatrix} + \begin{bmatrix} k1 & k2 \\ k3 & k4 \\ k5 & k6 \\ k7 & k8 \end{bmatrix}\begin{bmatrix} Is\gamma - \hat{I}s\gamma \\ Is\delta - \hat{I}s\delta \end{bmatrix}$$

In the equation (4), an output error feedback gain for multiplying the poles of the state estimator by Isγ–Îsγ, Isδ−Isδ can be set up arbitrarily. Therefore, the equation (4) can estimate an induced electromotive force in a manner insensitive to changes in the inductor motor constant, and adjust the time in which the estimated values are converged. When the equation (4) is used in an actual control process, it becomes a differential equation converted to a discrete system. Therefore, unlike the equation (1), it is not necessary to calculate a differential of the current for estimating an induced electromotive force, and measurement noise is not amplified. The state estimator is constructed on the γ-δ coordinate axes which are rotating at the angular velocity ω*. Since estimated values are DC components, changes in their errors with respect to actual values on the d-q coordinate axes are slow. If the poles are stably established, then it is not necessary to increase the poles unnecessarily to speed up the convergence.

In the method of estimating the speed of the induction motor according to the present invention, when the following current equation (5) for the rotor:

$$\frac{d}{dt}\begin{bmatrix} \Phi r\gamma \\ \Phi r\delta \end{bmatrix} = \begin{bmatrix} -Rr/Lr & \omega^*-\omega r \\ -(\omega^*-\omega r) & -Rr/Lr \end{bmatrix}\begin{bmatrix} \Phi r\gamma \\ \Phi r\delta \end{bmatrix} + \frac{LmRr}{Lr}\begin{bmatrix} Is\gamma \\ Is\delta \end{bmatrix} \quad (5)$$

is substituted for the flux differential term in the first term of the right-hand side of the equation (2) to eliminate the differential term of the secondary magnetic fluxes, the following equation (6) is obtained:

$$\begin{bmatrix} \varepsilon\gamma \\ \varepsilon\delta \end{bmatrix} = \frac{Lm}{Lr}\omega r\begin{bmatrix} -\Phi r\delta \\ \Phi r\gamma \end{bmatrix} + \frac{Lm^2}{Lr^2}Rr\begin{bmatrix} Is\gamma-Imr\gamma \\ Is\delta-Imr\delta \end{bmatrix} \quad (6)$$

However, the equation is developed on the γ-δ coordinate axes which are control reference coordinate axes.

If induced electromotive force estimated values are used in the equation (6), then $$\frac{Lm}{Lr}\omega r\begin{bmatrix} -\Phi r\delta \\ \Phi r\gamma \end{bmatrix} = \begin{bmatrix} \hat{\varepsilon}\gamma \\ \hat{\varepsilon}\delta \end{bmatrix} + \frac{Lm^2}{Lr^2}Rr\begin{bmatrix} Imr\gamma-Is\gamma \\ Imr\delta-Is\delta \end{bmatrix} \quad (7)$$

$$\equiv \begin{bmatrix} E_{\gamma est} \\ E_{\delta est} \end{bmatrix}$$

In the equation, new induced voltages are defined as Eγest, Eδest. The new induced voltages Eγest, Eδest are calculated by the right-hand side of the first row of the equation (7).

Based on the equation (7), a speed is estimated according to the following equation (8):

$$|\hat{\omega}r| = \frac{Lr}{Lm}\sqrt{\frac{E_{\gamma est}^2+E_{\delta est}^2}{\Phi r_\gamma^2+\Phi r_\delta^2}} \quad (8)$$

The sign of the speed is determined by the sign of Eδest. Thus, $$\omega r = sgn(E\delta est)|\omega r| \quad (9)$$

where sgn(Eδest) represents the sign of Eδest.

The speed is finally estimated according to the equation (9). For the secondary field currents Imrγ, Imrδ and the secondary fluxes Φrγ, Φrδ in the equations (7), (8), there is used a magnetic flux estimated value or a magnetic flux command value based on the equation (5).

If a magnetic flux command value is used, then, assuming that the command value for the secondary magnetic fluxes is represented by Φr*, the speed is estimated by:

$$\omega r = sgn(E\delta est)|\omega r| - KcomE\gamma est \quad (10)$$

where Kcom represents a gain.

If the secondary magnetic flux command value is used as described above, it is simultaneously necessary to perform a compensation process to bring the γ-δ coordinate axes and the d-q coordinate axes into agreement with each other. In the method of compensating for the axis displacement according to the present invention, since Eγest is a function of a δ component Φrδ of secondary magnetic fluxes generated when the γ-δ coordinate axes and the d-q coordinate axes are displaced from each other, as indicated by the equation (7), the speed command value is adjusted in a direction to eliminate Eγest for thereby compensating for the axis displacement.

Specifically, the equation (9) is expanded into the equation (10).

$$\Phi r\gamma=\Phi r^*, Imr\gamma=\Phi r^*/Lm, \Phi r\delta=Imr\delta=0 \quad (11)$$

In the method of estimating the speed according to the present invention, inasmuch as the speed is directly estimated using the induced electromotive force estimated values, the contradiction of the equation development according to the conventional processes is eliminated, reducing a control delay.

In the method of estimating the speed according to the present invention, the product of Eγest and the gain is subtracted from the estimated speed to adjust the estimated speed value in a direction to eliminate Eγest for thereby bringing the γ-δ coordinate axes and the d-q coordinate axes into agreement with each other. Eγest is composed of the electromotive force $\hat{\varepsilon}_\gamma$ estimated by the state estimator and the difference between the secondary field current and the excitation-related component of the stator current, and takes into account variations of the secondary magnetic fluxes. While the secondary magnetic fluxes are assumed to be constant according to the conventional processes, the method according to the present invention is free of such an assumption, and poses no problem even when the magnetic fluxes vary at the start of excitation when the induction motor is activated and at the time of field-weakening control.

BRIEF DESCRIPTION OF THE DRAWINGS

The sole FIGURE (FIG. 1) is a block diagram of an apparatus for controlling an induction motor according an embodiment of the present invention.

DESCRIPTION OF THE PREFERRED EMBODIMENTS

Figure 1:
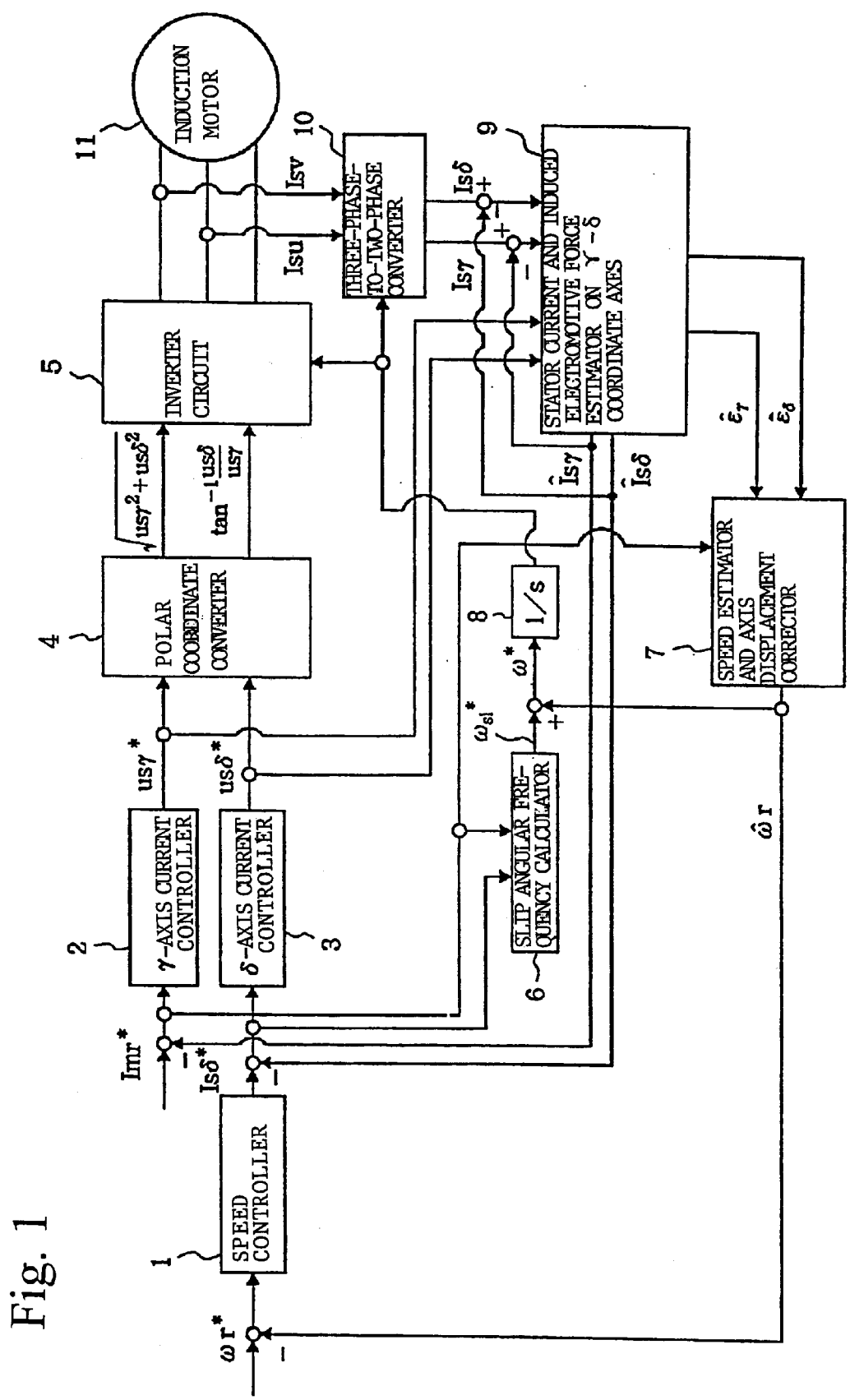

FIG. 1 is a block diagram of an apparatus for controlling an induction motor according an embodiment of the present invention.

The apparatus according to the embodiment serves to control an induction motor 11, and comprises a speed controller 1, a γ-axis current controller 2, a δ-axis current controller 3, a polar coordinate converter 4, an inverter circuit 5, a slip angular frequency calculator 6, a speed estimator and axis displacement corrector 7, an integrator 8, a stator current and induced electromotive force estimator 9 on γ-δ coordinate axes, and a three-phase-to-two-phase converter 10.

The speed controller 1 is supplied with the difference between a speed command value $\omega_\gamma{}^*$ and an estimated speed value $\hat{\omega}_\gamma$ and outputs a δ-axis current value Isδ*.

The δ-axis current controller 3 is supplied with the difference between a δ-axis current command value Isδ* and a δ-axis current Isδ and outputs a δ-axis voltage command value Usδ*.

The γ-axis current controller 2 is supplied with the difference between a command value Imr* (=Imrγ=Φr*/Lm) of a secondary field current related to the magnitude of secondary magnetic fluxes and a γ-axis current estimated value Isγ and outputs a γ-axis voltage command value Usγ*.

The polar coordinate converter 4 converts the voltage command values Usδ*, Usγ* into magnitudes and phases of the voltage command values.

The inverter circuit 5 is supplied with an output from the polar coordinate converter 4 and the position of the rotated γ-δ coordinate axes outputted from the integrator 8, and generates a PWM signal to energize the induction motor 11.

The three-phase-to-two-phase converter 10 detects three-phase currents from stator currents Isu, Isv and converting the detected three-phase currents into two-phase alternating currents. The stator current and induced electromotive force estimator 9 on the γ-δ coordinate axes is supplied with Isγ, Isδ subjected to coordinate transformation using the position of the γ-δ coordinate axes from the two-phase alternating currents and the voltage command values Usγ*, Usδ*, performs calculations thereon according to the equation (4), and outputs estimated values Îsγ, Îsδ of the stator currents and estimated values $\hat{\epsilon}_\gamma$, $\hat{\epsilon}_\delta$ of an induced electromotive force in the γ-δ coordinate system.

The speed estimator and axis displacement corrector 7 is supplied with the estimated values $\hat{\epsilon}_\gamma$, $\hat{\epsilon}_\delta$ of the induced electromotive force, performs calculations according to the equations (7), (8), (10), and outputs an estimated speed value $\hat{\omega}_\gamma$.

The slip angular frequency calculator 6 performs calculations according to the equation (12) to determine a slip angular frequency command value $\omega_{sl}{}^*$.

$$\omega_{sl}^* = \frac{Rr \cdot Is\delta^*}{Lr \cdot Imr^*} \quad (12)$$

The integrator 8 converts a rotational speed of the γ-δ coordinate axes determined by adding the estimated speed value $\omega_\gamma$ and the slip angular frequency command value $\omega_{sl}{}^*$ to each other into an angle, and outputs the angle to the inverter circuit 5 and the three-phase-to-two-phase converter 10.

If the present embodiment is implemented by software, then all the calculations are discretely approximated in use.

What is claimed is:

1. A method of controlling an induction motor by bringing γ-δ coordinate axes which are reference coordinate axes of a control system configuration into agreement with d-q coordinate axes where the d-axis represents the direction of the vector of secondary magnetic fluxes of the induction motor and the q-axis represents an axis perpendicular to the d-axis, said method comprising the steps of detecting at least two of three-phase stator currents of the induction motor, converting the detected stator currents into a γ-δ coordinate system to derive a γ-axis current Isγ and a δ-axis current Isδ, constructing a state estimator using differences Isγ–Îsγ, Isδ–Îsδ between estimated values Îsγ, Îsδ of the γ-axis current and the δ-axis current in a preceding control loop and actual values thereof as corrective quantities, using stator voltage command values Usγ*, Usδ* in the γ-δ coordinate system as inputs, and using an induced electromotive force generated by rotation of a rotor as a disturbance, and estimating estimated values Îsγ, Îsδ of stator currents and estimated values $\hat{\epsilon}_\gamma$, $\hat{\epsilon}_\delta$ of the induced electromotive force in the γ-δ coordinate system.

2. A method of estimating a speed of an induction motor, comprising the steps of adding the product of the difference Imrγ–Isγ between an estimated value or a command value Imrγ of a γ component of a secondary field current and a γ component Isγ of a stator current and a motor constant to a γ-axis induced electromotive force $\hat{\epsilon}_\gamma$ in the γ-δ coordinate system which has been estimated by the method according to claim 1, thereby to calculate a new induced voltage Eγest, adding the product of the difference Imrδ–Isδ between an estimated value or a command value Imrδ of a δ component of the secondary field current and a δ component Isδ of the stator current and the motor constant to a δ-axis induced electromotive force $\hat{\epsilon}_\delta$ in the γ-δ coordinate system which has been estimated by the above method, thereby to calculate a new induced voltage Eδest, estimating the magnitude of a rotor speed $\omega_\gamma$ of the induction motor using the sum of the squares of the induced voltages Eγest, Eδest and an estimated value or a command value of secondary magnetic fluxes, determining the sign of the rotor speed with the sign of the induced voltage Eδest, and estimating an estimated value $\hat{\omega}_\gamma$ of the rotor speed.

3. A method of correcting an axis displacement of the induction motor defined according to claim 2, comprising the step of subtracting the product of the induced voltage Eγest and a gain from the estimated speed value to adjust the estimated speed value in a direction to eliminate the induced voltage Eγest for thereby bringing γ-δ coordinate axes into agreement with d-q coordinate axes.

4. An apparatus for controlling an induction motor by bringing γ-δ coordinate axes which are reference coordinate axes of a control system configuration into agreement with d-q coordinate axes where the d-axis represents the direction of the vector of secondary magnetic fluxes of the induction motor and the q-axis represents an axis perpendicular to the d-axis, comprising:

a speed controller for being supplied with the difference between a speed command value $\omega_\gamma{}^*$ and an estimated speed value $\hat{\omega}_\gamma$ as a first difference and outputting a δ-axis current value Isδ*;

a δ-axis current controller for being supplied with the difference between a δ-axis current command value Isδ* and a δ-axis current Isδ or a δ-axis current estimated value Îsδ and outputting a δ-axis voltage command value Usδ*;

a γ-axis current controller for being supplied with the difference between a command value Imr* of a secondary field current related to the magnitude of secondary magnetic fluxes and a γ-axis current $Îsγ$ or a γ-axis current estimated value $Îsγ$ as a second difference and outputting a γ-axis voltage command value $Usγ*$;

a polar coordinate converter for converting the voltage command values $Usδ*$, $Usγ*$ into magnitudes and phases of the voltage command values;

a slip angular frequency calculator for being supplied with the first difference and the second difference and determining a slip angular frequency command value $ω_{sl}*$;

an integrator for converting a rotational speed of the γ-δ coordinate axes determined by adding the estimated speed value $\hat{ω}_γ$ and the slip angular frequency command value $ω_{sl}*$ to each other into an angle;

an inverter circuit for being supplied with an output from the polar coordinate converter and the position of the rotated γ-δ coordinate axes outputted from the integrator, and generating a PWM signal to energize the induction motor;

a three-phase-to-two-phase converter for detecting three-phase currents from stator currents Isu, Isv and converting the detected three-phase currents into two-phase alternating currents; and a stator current and induced electromotive force estimator for being supplied with Isγ, Isδ subjected to coordinate transformation using the position of the γ-δ coordinate axes from the two-phase alternating currents and the voltage command values $Usγ*$, $Usδ*$, performing calculations thereon, and outputting estimated values $Îsγ$, $Îsδ$ of the stator currents and estimated values $\hat{ε}_γ$, $\hat{ε}_δ$ of an induced electromotive force in the γ-δ coordinate system.

5. An apparatus according to claim 4, further comprising a speed estimator for being supplied with the estimated values $\hat{ε}_γ$, $\hat{ε}_δ$ of the induced electromotive force and carrying out a method of estimating the speed.

6. An apparatus according to claim 5, further comprising an axis displacement corrector.

* * * * *